(12) United States Patent
Thacker et al.

(10) Patent No.: US 7,218,724 B2
(45) Date of Patent: May 15, 2007

(54) METHODS, SYSTEMS AND COMPUTER PROGRAM PRODUCTS FOR AUTOMATICALLY UPDATING LONG DISTANCE COUNTRY CODES

(75) Inventors: Terry D. Thacker, Lawrenceburg, KY (US); Charles E. Raymond, Louisville, KY (US); Robert H. Wright, Ramsey, IN (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 978 days.

(21) Appl. No.: 10/439,436

(22) Filed: May 16, 2003

(65) Prior Publication Data
US 2004/0228467 A1    Nov. 18, 2004

(51) Int. Cl.
*H04M 7/00* (2006.01)
*H04M 1/00* (2006.01)

(52) U.S. Cl. .............................. 379/221.14; 379/355.08

(58) Field of Classification Search ........... 379/213.01, 379/220.01, 221.14, 355.08; 455/414.1, 455/456.3
See application file for complete search history.

(56) References Cited

U.S. PATENT DOCUMENTS 5,475,743 A * 12/1995 Nixon et al. ........... 379/355.07
6,078,655 A * 6/2000 Fahrer et al. ........... 379/220.01
6,192,124 B1 * 2/2001 Yim ....................... 379/355.08
6,310,948 B1   10/2001 Nemeth
6,959,192 B1 * 10/2005 Cannon et al. ........... 455/456.3

OTHER PUBLICATIONS

International Telecommunication Union, Annex to ITU Operational Bulletin No. 763—1.V.2002, *ITU-T Telecommunication Standardization Section of ITU—Complement to ITU-T Recommendation E.164* (May 1997): *List of ITU-T Recommendation E.164 Assigned Country Codes* (Position on May 1, 2002), Geneva, 2002, 17 pp.

* cited by examiner

*Primary Examiner*—Bing Q. Bui
(74) *Attorney, Agent, or Firm*—Myers Bigel Sibley & Sajovec, P.A.

(57) ABSTRACT

Long distance country codes that are used by a group of users are updated by automatically sending an electronic message to the group of users that includes at least one new or changed long distance country code, in response to automatically obtaining a listing of long distance country codes from an International Telecommunication Union (ITU) website. More specifically, a listing of long distance country codes is automatically obtained from the ITU website. The listing of long distance country codes that is obtained from the ITU website is automatically compared to preexisting long distance country codes that are used by the group of users, to identify at least one new or changed long distance country code. An electronic message, such as an email message, is automatically sent to the group of users that includes the at least one new or changed long distance country code that was identified.

53 Claims, 4 Drawing Sheets

METHODS, SYSTEMS AND COMPUTER PROGRAM PRODUCTS FOR AUTOMATICALLY UPDATING LONG DISTANCE COUNTRY CODES

FIELD OF THE INVENTION

This invention relates to the telecommunications methods, systems and computer program products, and more particularly to international telecommunications systems, methods and computer program products.

BACKGROUND OF THE INVENTION

Telecommunications systems, methods and computer program products are widely used for worldwide communications of voice, multimedia and/or data. As is well known to those having skill in the art, long distance country codes are used in international direct dialing. The long distance country codes are also referred to in the telecommunications industry as assigned country codes, IDDD codes or simply as country codes. For example, the United States is assigned country code 1, France is assigned country code 33 and Japan is assigned country code 81. These country codes are assigned by the International Telecommunication Union (ITU).

The long distance country codes are used within a telecommunications provider that operates a plurality of telecommunications switches to provision the switches. In particular, a telecommunications provider may include a Complex Translations Group (CTG), often referred to as a Translations Group, which includes technicians who are responsible for programming country codes, area codes, local switch codes and/or other codes in the switches. This process is referred to as provisioning the switches. If an improper long distance country code is provisioned in the switch, it may result in improper routing of a call. Other telecommunications system users also may use the long distance country codes for direct dialing of long distance calls, either manually or in connection with speed dialing or automatic dialing devices.

As is also well known to those having skill in the art, country codes may change. These changes may occur when a new country code is added or a country code is changed. The CTG within a telecommunications company often finds out about a new or changed country code as a result of a customer trouble report, when a customer attempted to dial an international long distance number and was routed to the wrong number or could not connect. In other instances, an email may be received from another member of the CTG staff, or another member of the telecommunications provider who learns about the new or changed country code. This may be contrasted from changes in area codes, wherein the telecommunications provider typically initiates the change in an area code, and therefore has advance notice of the change in an area code. The switch can then be provisioned with the new area code at the appropriate time, to reduce or eliminate dialing or routing errors.

SUMMARY OF THE INVENTION

Some embodiments of the present invention update long distance country codes that are used by a group of users, by automatically sending to the group of users an electronic message that includes at least one new or changed long distance country code, in response to automatically obtaining a listing of long distance country codes from an International Telecommunication Union (ITU) website. More specifically, in some embodiments, a listing of long distance country codes is automatically obtained from the ITU website. The listing of long distance country codes that is obtained from the ITU website is automatically compared to preexisting long distance country codes that are used by the group of users, to identify at least one new or changed long distance country code. An electronic message, such as an email message, is automatically sent to the group of users that includes the at least one new or changed long distance country code that was identified.

In some embodiments, the listing of long distance country codes is automatically obtained from the ITU website at spaced apart time intervals. Accordingly, long distance country codes may be automatically updated at regular intervals, without the need to rely on trouble reports and/or other failure mechanisms to alert users of a new or changed country code. Thus, in some embodiments, the preexisting long distance country codes that are used by the group of users correspond to the listing of long distance country codes that was automatically obtained from the ITU website in an immediately preceding time interval. In other embodiments, however, the automatically obtaining is performed in response to a trouble report that indicates that at least one of the preexisting country codes is inoperative. It also will be understood that the listing of long distance country codes may be obtained from a source that directly or indirectly obtained the listing of long distance country codes from the ITU website.

In some embodiments, the group of users comprises telecommunications provider technicians who are responsible for provisioning a plurality of telecommunications switches. In these embodiments, the telecommunications switches may be provisioned with the at least one new or changed country code.

In some embodiments, electronic mail addresses of the group of users are obtained so that the electronic mail message can be sent to the these electronic mail addresses. In other embodiments, an electronic message is automatically sent to the group of users to indicate that no new or changed country codes were identified. In still other embodiments, the listing of long distance country codes from the ITU website and the preexisting long distance country codes that are used by the group of users are compared by running a no match query on at least one database in which both groups of country codes are stored.

Finally, it will be understood that embodiments of the present invention were described above primarily with respect to methods of updating long distance country codes and of provisioning a plurality of telecommunication switches with long distance country codes. However, other embodiments may provide analogous systems and/or computer program products.

DETAILED DESCRIPTION

Figure 1:
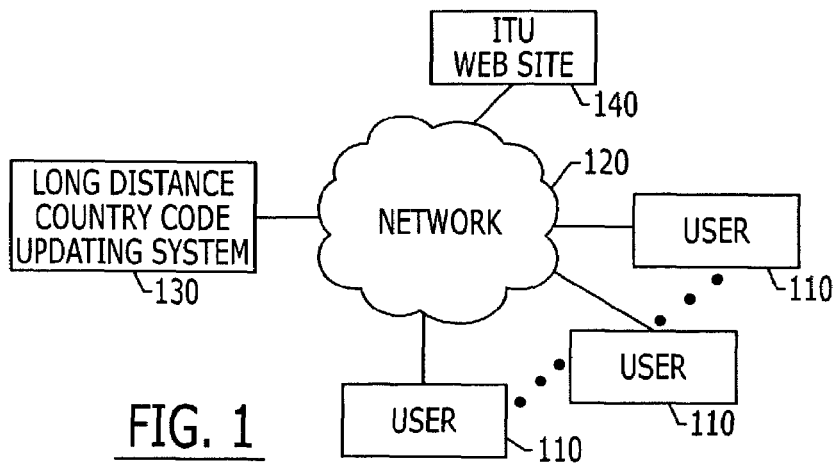
FIG. 1 is a block diagram of systems for updating long distance country codes that are used by a group of users according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of systems for updating long distance codes that are used by a group of users according to some embodiments of the present invention. As shown in FIG. 1, a plurality of users 110 are connected via a network 120 to a long distance country code updating system 130. In some embodiments, the network includes the Internet, and the connections may be wired and/or wireless connections. In other embodiments, the network 120 can also include an intranet, extranet and/or other public and/or private network. The ITU website 140 is also directly or indirectly connected to the network 120. The ITU website may be found on the World Wide Web at itu.org. The ITU website includes a "List of ITU-T Recommendation E.164 Assigned Country Codes" at itu.int/itudoc/itu-t/ob-lists/icc/e164_763_ww9.doc. This listing is also available on the ITU home page at itu.int/itu-t/bulletins/index.html and can be consulted by subscribers by remote access. It will be understood that other addresses may be used to access the ITU website. It also will be understood that other sources also may be accessed via the network 120, which directly or indirectly obtain the listing of long distance country codes from the ITU website 140.

Still referring to FIG. 1, in some embodiments, the long distance country code updating system 130 can be embodied as a network-connectable computer that is capable of sending and receiving emails. One or more enterprise, application, personal and/or pervasive computing devices may be used. In some embodiments, the long distance country code updating system 130 is configured to automatically send an electronic message to the group of users 110 that includes at least one new or changed long distance country code, in response to automatically obtaining a listing of long distance country codes directly or indirectly from the ITU website 140.

Figure 2:
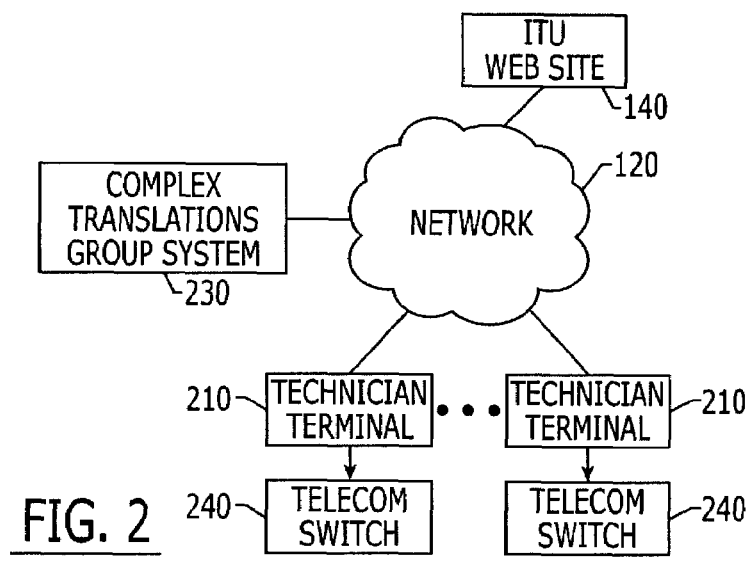
FIG. 2 is a block diagram of systems for provisioning a plurality of telecommunications switches with long distance country codes according to some embodiments of the present invention.

FIG. 2 is a block diagram of systems for provisioning a plurality of telecommunications switches 240 with long distance country codes according to some embodiments of the present invention. As shown in FIG. 2, these systems include a plurality of technician terminals 210 that may interface with the network 120. In some embodiments, the technician terminals are desktop computers, laptop computers, Personal Digital Assistants (PDAs) and/or other conventional wired or wireless terminals. The technicians provision the telecommunications switches 240 using the technician terminals 210 and/or using manual provisioning operations that are well known to those having skill in the art. A complex translations group system 230 is configured to automatically send to the technician terminals 210 of those technicians who are responsible for provisioning the telecommunications switches 240, an electronic message that includes at least one new or changed long distance country code, in response to automatically obtaining a listing of long distance country codes directly or indirectly from the ITU website 140. It will be understood that the complex translations group system 230 may be embodied as one or more enterprise, application, personal and/or pervasive computing devices.

Figure 3:
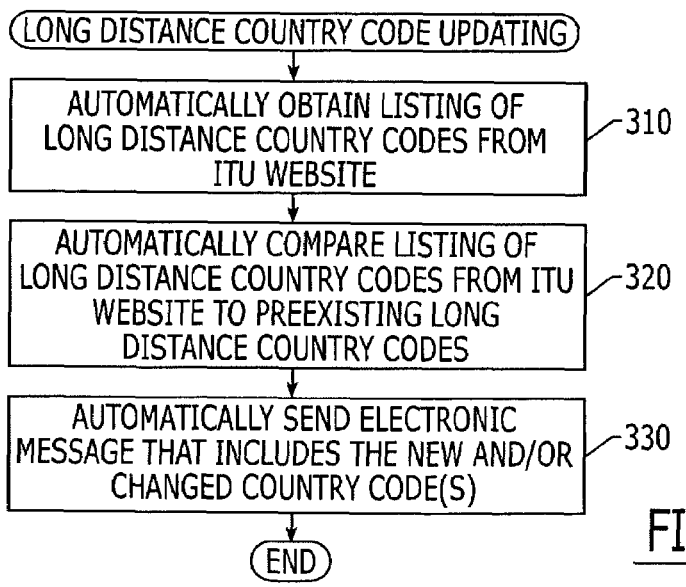
FIGS. 3–5 are flowcharts of operations that may be performed to update long distance country codes according to various embodiments of the present invention.

FIG. 3 is a flowchart of operations that may be performed for long distance country code updating according to some embodiments of the present invention. These operations may be performed, for example, by the long distance country code updating system 130 of FIG. 1 and/or the complex translations group system 230 of FIG. 2. Referring now to FIG. 3, at Block 310, a listing of long distance country codes is automatically obtained directly or indirectly from an ITU website such as the ITU website 140. At Block 320, the listing of long distance country codes that is obtained from the ITU website is automatically compared to preexisting long distance country codes that are used by the group of users, such as users 110 of FIG. 1 or technicians associated with the technician terminals 210 of FIG. 2, to identify at least one new or changed long distance country code. Finally, at Block 330, an electronic message is automatically sent to the group of users that includes the at least one new or changed country code that was identified.

Figure 4:
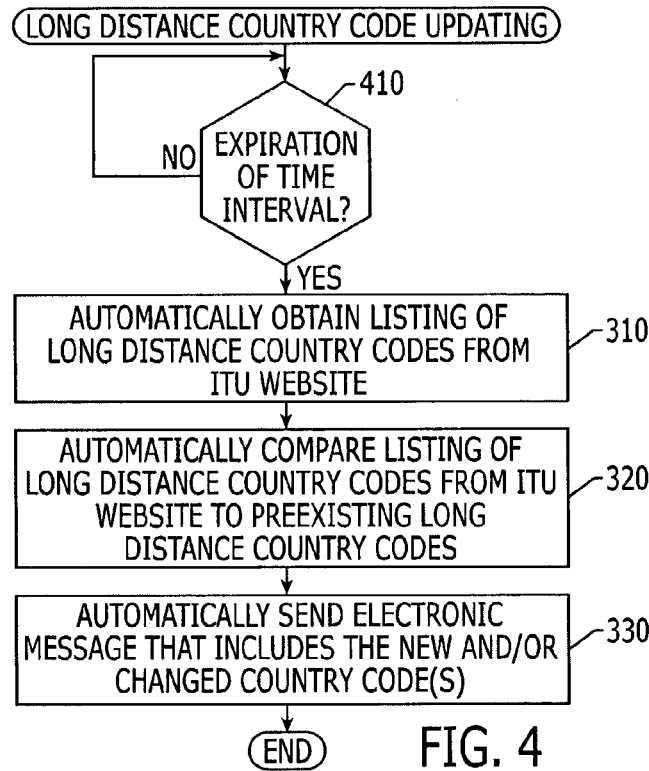

FIG. 4 is a flowchart of operations that may be performed according to other embodiments of the present invention. In particular, FIG. 4 illustrates embodiments in which the operations of FIG. 3 may be repeatedly performed at spaced apart time intervals. For example, the operations may be automatically performed once per day, once per week, once per month, etc., based, for example, on an expected update frequency of the ITU website 140. Thus, referring to FIG. 4, at Block 410, upon expiration of the time interval, the operations of Blocks 310, 320 and 330 are performed. In these embodiments, the preexisting long distance country codes that are used by the group of users may correspond to the listing of long distance country codes that was automatically obtained from the ITU website 140 in an immediately preceding time interval.

Figure 5:
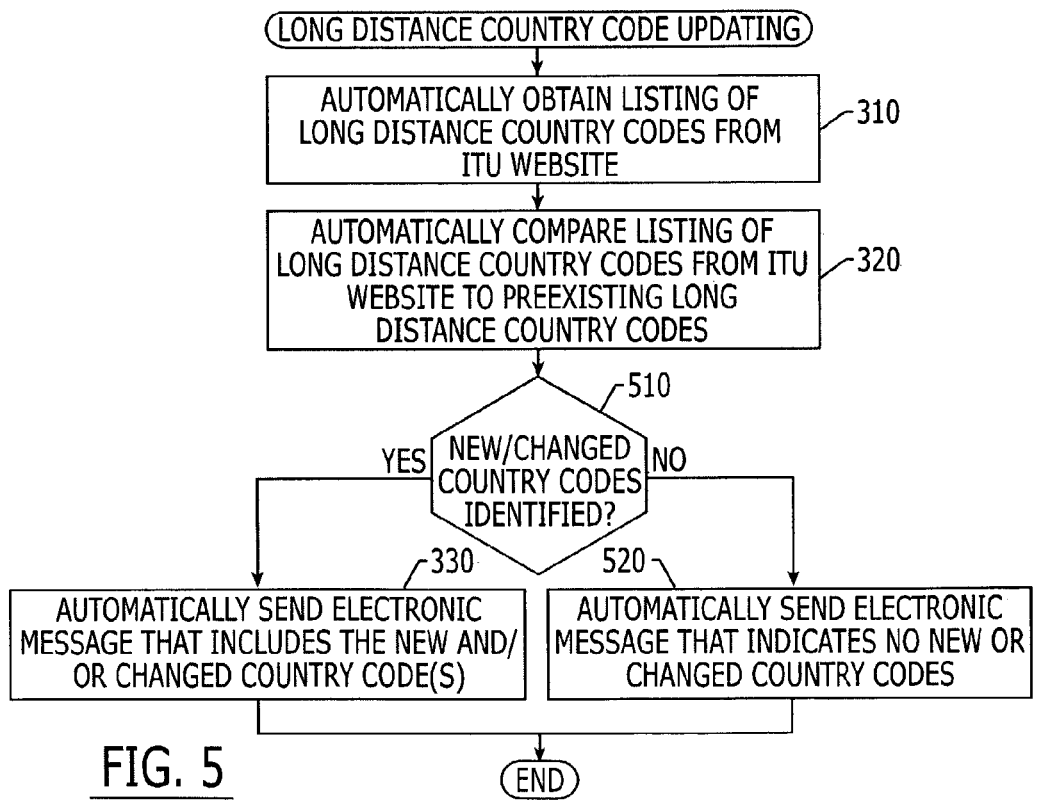

FIG. 5 is a flowchart of operations that may be performed according to yet other embodiments of the present invention. In FIG. 5, an electronic mail message may be sent whether or not new or changed country codes were identified. Thus, users can be provided an indication that the country code updating continues to be operational, even though no updates were received. In particular, referring to FIG. 5, operations of Blocks 310 and 320 are performed. Then, at Block 510, a determination is made as to whether new or changed country codes were identified in the operations of Block 320. If yes, then operations of Block 330 are performed. If no, then an electronic message is automatically sent that indicates that no new or changed country codes were found, at Block 520.

Figure 6:
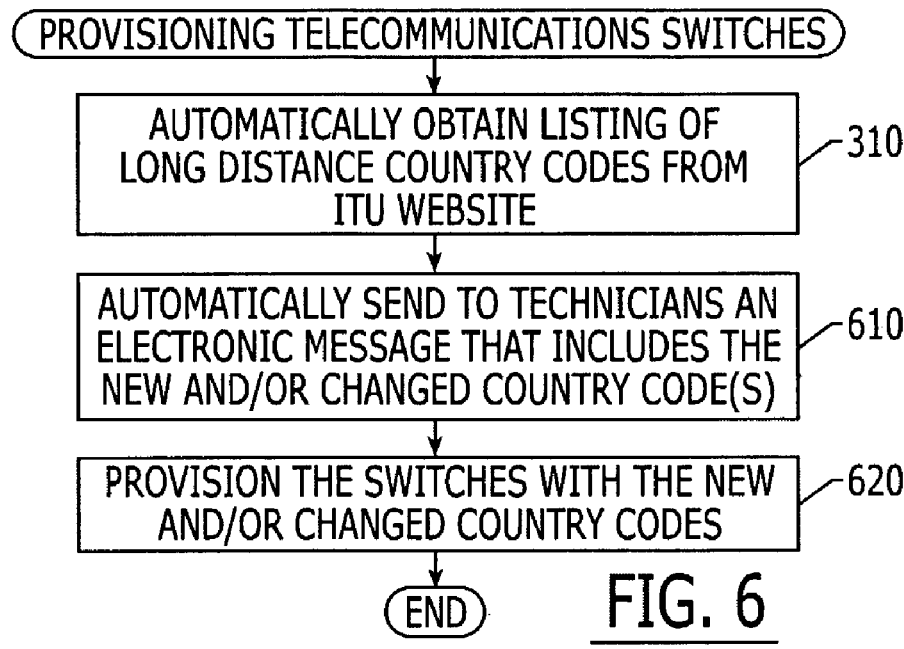
FIG. 6 is a flowchart of operations that may be performed to provision a telecommunications switch according to embodiments of the present invention.

FIG. 6 is a flowchart of operations that may be performed to provision telecommunications switches according to some embodiments of the present invention. These operations may be performed, for example, by the complex translations group terminals 230 of FIG. 2 and/or by the technicians who are associated with these terminals. Referring to FIG. 6, the operations of Block 310 are performed. Then at Block 610, an electronic message that includes the new or changed country codes is automatically sent to the technicians who are responsible for provisioning the switches 240. At Block 620, the switches are then provisioned with the new or changed country codes, for example using conventional provisioning procedures. It also will be understood that in other embodiments, combinations or subcombinations of FIGS. 3–6 may be provided.

Figure 7:
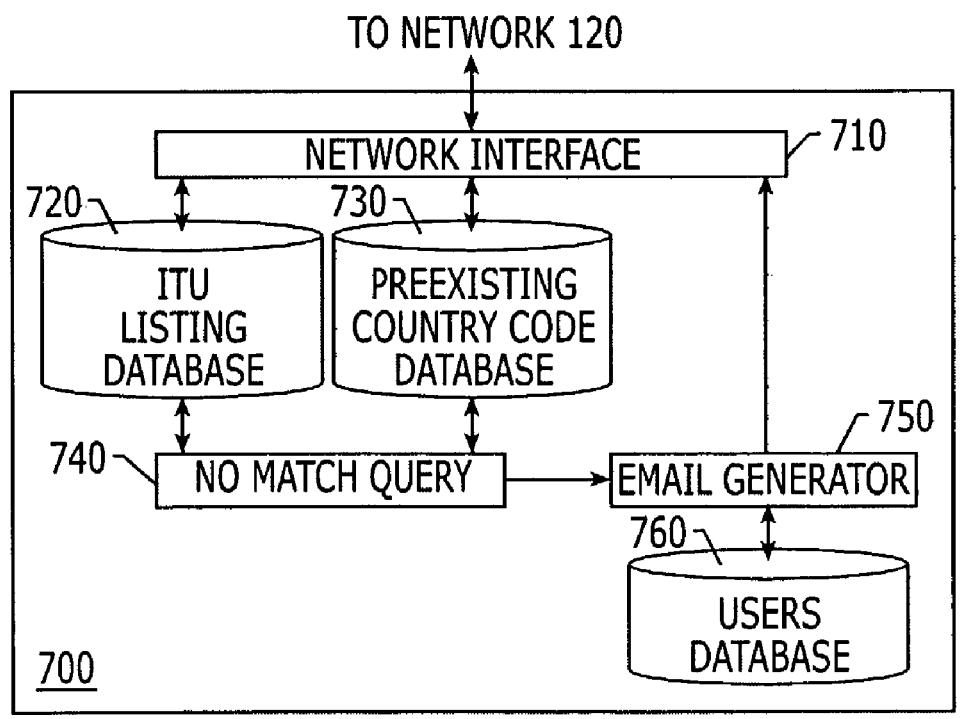
FIG. 7 is a block diagram of a network-connected computer that is configured to update long distance country codes according to embodiments of the present invention.

FIG. 7 is a block diagram of systems that may be used to update long distance country codes according to other embodiments of the invention. These systems 700 may provide embodiments of a long distance country code updating system 130 of FIG. 1 and/or a complex translations group system 230 of FIG. 2. These systems 700 may be embodied in one or more personal, application, enterprise and/or pervasive computing devices that include a network interface 710, such as a conventional Internet interface.

As shown in FIG. 7, an ITU listing database 720 contains therein a listing of long distance country codes that is automatically obtained from the ITU website via the network interface 710. A preexisting country code database 730 contains the preexisting long distance country codes that are used by the group of users. In some embodiments, the preexisting country code database 730 comprises the listing of long distance country codes that was obtained from the ITU website in an immediately preceding time interval. In some embodiments, the ITU listing database 720 and the preexisting country code database 730 are contained in a single database. In some embodiments, these databases are contained in a conventional Microsoft Access database operating in a conventional Microsoft Windows NT environment. An email generator 750 also is included that generates an email to users that are listed in a users database 760. The email generator may operate using a conventional Microsoft Outlook program and a conventional Microsoft Word program operating in a conventional Microsoft Windows NT environment.

The system 700 of FIG. 7 may implement operations of FIGS. 3–6, according to some embodiments of the invention, by allowing a conventional Windows NT Task Scheduler to schedule a conventional Microsoft Excel spreadsheet to open at a predefined time period. When the Excel spreadsheet opens, a conventional auto-open macro may be used to download the long distance country codes from the ITU website across the Internet using the network interface 710 and to import the downloaded country codes into the Excel spreadsheet. The downloaded country codes may then be moved to an ITU listing database 720.

A conventional no match query 740 may be run in Microsoft Access using a standard query wizard, to compare the ITU listing database 720 to the preexisting country code database 730. The query can return empty if everything matches. If so, the process can end or the email generator 750 can generate a no match email using the users database 760, as was described at Block 520 of FIG. 5. On the other hand, if differences were found, emails may be built using conventional Microsoft Word macros and sent to the users as was described at Block 330.

In some embodiments, these emails may have a subject of "Country Code Change/Update Notification". The body of the email may be different depending on whether a country code is changed or a country code is updated. In a hypothetical example that Monaco was made a part of France, the body of the change notification email may appear as follows:

| | Country code | Country, Geographical area or Global service |
|---|---|---|
| From: | 377 | Monaco (Principality of) |
| To: | 33 | France |

In another hypothetical example, if France formed a new country, the body of the update notification may appear as follows:

| | Country code | Country, Geographical area or Global service |
|---|---|---|
| Add: | 210 | "The country formely known as France". |

Other email message formats may be used.

It will also be understood that the users database 760 may be maintained automatically. For example, a user may log on to the system 700, for example using the Internet, and add, update or delete the user's name. It also will be understood that embodiments of FIG. 7 may be used with embodiments of FIGS. 3–6 and combinations and subcombinations thereof.

Figure 8:
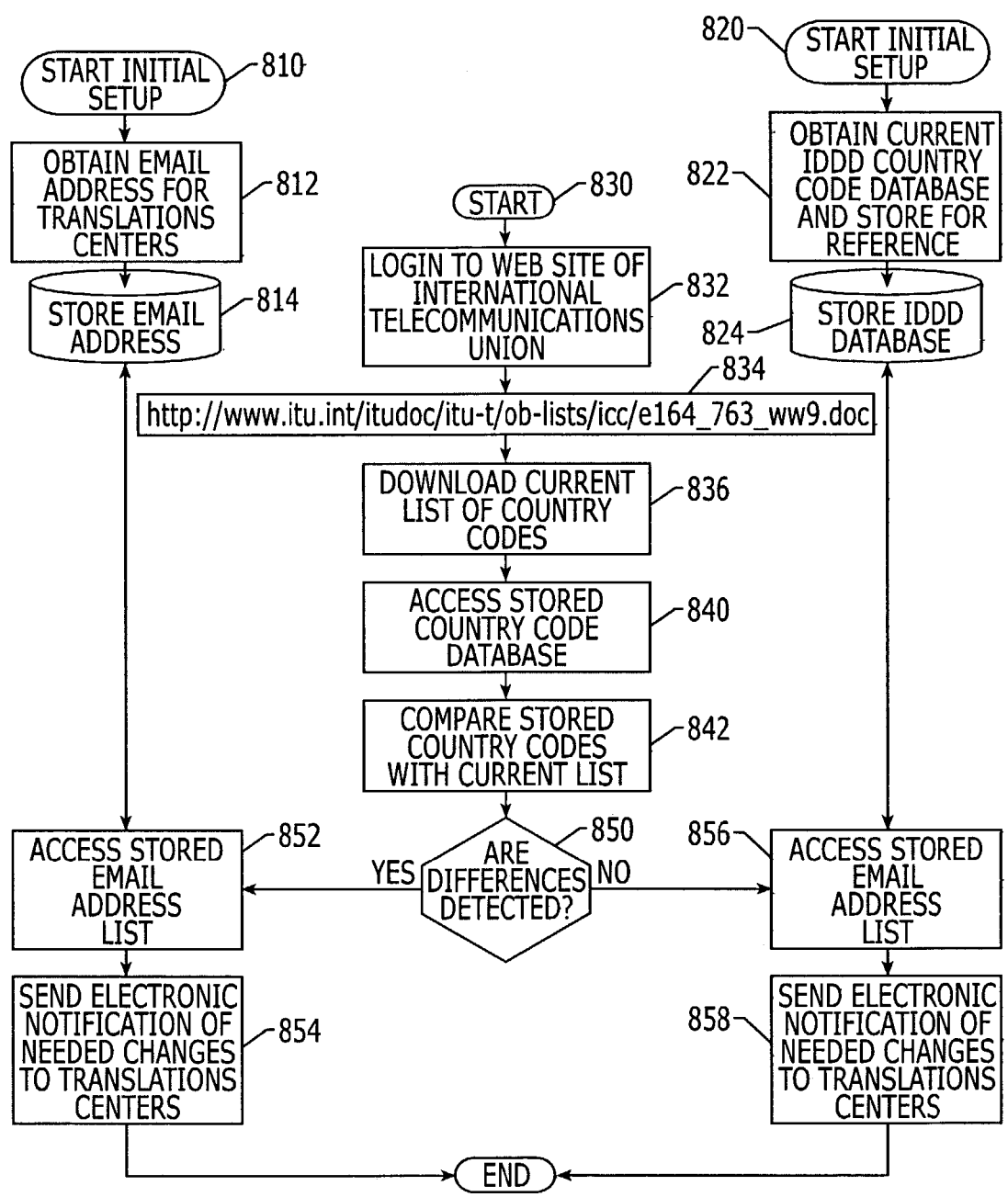
FIG. 8 is a block diagram of operations that may be performed to update long distance country codes according to other embodiments of the present invention.

FIG. 8 is a flowchart of other embodiments of the present invention. Prior to actually starting the updating operations at Block 830, some initial set up activities are performed. Thus, at Block 810, initial set up activities are begun to obtain email addresses for the translation centers of the translation group and/or other users who are to receive the automatic updating of long distance country codes, at Block 812. At Block 814, these email address are stored in a database on the computer hosting the program, which may correspond to the users database 760 of FIG. 7. As also shown at Block 820, initial setup may also include setting up a database containing a current list of country codes and storing them for reference at Block 822 in an IDDD database 824, which may correspond to the preexisting country code database 730 of FIG. 7.

Updating operations then begin at Block 830. The operations that begin at Block 830 may begin at a scheduled time and/or upon manual activation, for example upon receiving a trouble complaint. At Block 832, the operations access the Web page of the ITU, an address of which is shown at Block 834, and download the current list of country codes at Block 836, for example into the ITU Listing database 720 of FIG. 7. At Block 840, the previously stored country code (IDDD) database 824 is accessed and the two lists are compared at Block 842. If differences are detected at Block 850, then the stored email address list, such as the users database 760, is accessed at Block 852, and at Block 854, the updates/changes are emailed to the appropriate addresses. On the other hand, if differences are not detected at Block 850, then the email address list may be accessed at Block 856 and an email message that no changes are needed may be sent at Block 858.

Embodiments of the present invention can reduce or prevent lack of timely notification of changes to or additions of country codes related to international direct dialing. A customer trouble report or other random observation or email need not be relied on to initiate a change. Rather, in some embodiments, the Complex Translations Group in each state may be notified periodically of additions or changes. In some embodiments, all manual activity and potentially all oversight can be removed from the notification process, to allow better service to telecommunications systems customers. Embodiments of the invention can include components to run on a scheduled basis, query the website of the ITU, download the latest list of country codes, compare to the previous list and send electronic notification to responsible users. Embodiments of the present invention may be used to improve the provisioning of telecommunication switches. Moreover, embodiments of the invention may be used to provide updates to users on a subscription basis.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of updating long distance country codes that are used by a group of users comprising:
   automatically obtaining a listing of long distance country codes from an International Telecommunication Union (ITU) website;
   automatically comparing the listing of long distance country codes that is obtained from the ITU website to preexisting long distance country codes that are used by the group of users, to identify at least one new or changed long distance country code; and
   automatically sending an electronic message to the group of users that includes the at least one new or changed long distance country code that was identified.

2. A method according to claim 1 wherein the automatically obtaining a listing is repeatedly performed at spaced apart time intervals.

3. A method according to claim 1 wherein the group of users comprises telecommunications technicians who are responsible for provisioning a plurality of telecommunications switches, the method further comprising:
   provisioning the plurality of telecommunications switches with the at least one new or changed long distance country code.

4. A method according to claim 1:
   wherein the automatically sending an electronic message is preceded by obtaining electronic mail addresses of the group of users; and
   wherein the automatically sending an electronic message comprises automatically sending an electronic mail message to the electronic mail addresses of the group of users that includes the at least one new or changed long distance country code that was identified.

5. A method according to claim 1 wherein the automatically comparing is preceded by storing the preexisting long distance country codes that are used by the group of users.

6. A method according to claim 1 further comprising automatically sending an electronic message to the group of users that indicates that no new or changed long distance country codes were identified in response to failure of the automatically comparing to identify at least one new or changed long distance country code.

7. A method according to claim 2 wherein the preexisting long distance country codes that are used by the group of users correspond to the listing of long distance country codes that was automatically obtained from the ITU website in an immediately preceding time interval.

8. A method according to claim 1 wherein the automatically comparing comprises:
   storing the listing of long distance country codes from the ITU website and the preexisting long distance country codes that are used by the group of users in at least one database; and
   running a no match query on the at least one database to identify the at least one new or changed long distance country code.

9. A method according to claim 1 wherein the automatically obtaining is performed in response to a trouble report that indicates that at least one of the preexisting country codes is inoperative.

10. A method according to claim 1 wherein the automatically obtaining comprises automatically obtaining the listing of long distance country codes from a source that directly or indirectly obtained the listing of long distance country codes from the ITU website.

11. A method of updating long distance country codes that are used by a group of users comprising:
   automatically sending an electronic message to the group of users that includes at least one new or changed long distance country code, in response to automatically obtaining a listing of long distance country codes from an International Telecommunication Union (ITU) website.

12. A method according to claim 11 wherein the automatically sending is repeatedly performed at spaced apart time intervals.

13. A method according to claim 11 wherein the group of users comprises telecommunications technicians who are responsible for provisioning a plurality of telecommunications switches, the method further comprising:
provisioning the plurality of telecommunications switches with the at least one new or changed long distance country code.

14. A method according to claim 11 further comprising automatically sending an electronic message to the group of users that indicates that no new or changed long distance country codes were identified.

15. A method of provisioning a plurality of telecommunications switches with long distance country codes, comprising:
automatically sending to technicians who are responsible for provisioning the plurality of telecommunications switches, an electronic message that includes at least one new or changed long distance country code, in response to automatically obtaining a listing of long distance country codes from an International Telecommunication Union (ITU) website.

16. A method according to claim 15:
wherein the automatically sending is preceded by automatically obtaining the listing of long distance country codes from the ITU website; and
wherein the automatically sending comprises automatically comparing the listing of long distance country codes that is obtained from the ITU website to preexisting long distance country codes that are used by the technicians, to identify at least one new or changed long distance country code.

17. A method according to claim 16 wherein the automatically obtaining the listing is repeatedly performed at spaced apart time intervals.

18. A method according to claim 16 wherein the automatically comparing is preceded by storing the preexisting long distance country codes that are used by the technicians.

19. A method according to claim 16 further comprising automatically sending an electronic message to the technicians that indicates that no new or changed long distance country codes were identified in response to failure of the automatically comparing to identify at least one new or changed long distance country code.

20. A method according to claim 16 wherein the preexisting long distance country codes that are used by the technicians correspond to the listing of long distance country codes that was automatically obtained from the ITU website in an immediately preceding time interval.

21. A method according to claim 16 wherein the automatically comparing comprises:
storing the listing of long distance country codes from the ITU website and the preexisting long distance country codes that are used by the technicians in at least one database; and
running a no match query on the at least one database to identify the at least one new or changed long distance country code.

22. A method according to claim 16 wherein the automatically obtaining is performed in response to a trouble report that indicates that at least one of the preexisting country codes is inoperative.

23. A method according to claim 16 wherein the automatically obtaining comprises automatically obtaining the listing of long distance country codes from a source that directly or indirectly obtained the listing of long distance country codes from the ITU website.

24. A system for updating long distance country codes that are used by a group of users comprising:
a network-connectable computer system that is configured to automatically send an electronic message to the group of users, via a network, that includes at least one new or changed long distance country code, in response to automatically obtaining, via the network, a listing of long distance country codes from an International Telecommunication Union (ITU) website.

25. A system according to claim 24 wherein the network-connectable computer system is further configured to automatically compare the listing of long distance country codes that is obtained from the ITU website to preexisting long distance country codes that are used by the group of users, to identify at least one new or changed long distance country code.

26. A system according to claim 24 wherein the network-connectable computer system is configured to automatically send the electronic message at spaced apart time intervals.

27. A system according to claim 24 wherein the group of users comprises telecommunications technicians who are responsible for provisioning a plurality of telecommunications switches.

28. A system according to claim 24 wherein the network-connectable computer system is further configured to obtain electronic mail addresses of the group of users.

29. A system according to claim 24 wherein the network-connectable computer system is further configured to store the preexisting long distance country codes that are used by the group of users.

30. A system according to claim 25 wherein the network-connectable computer system is further configured to automatically send an electronic message to the group of users that indicates that no new or changed long distance country codes were identified in response to failure of the network-connectable computer system to identify at least one new or changed long distance country code.

31. A system according to claim 26 wherein the preexisting long distance country codes that are used by the group of users correspond to the listing of long distance country codes that was automatically obtained from the ITU website in an immediately preceding time interval.

32. A system according to claim 25 wherein the network-connectable computer system is configured to automatically compare by storing the listing of long distance country codes from the ITU website and the preexisting long distance country codes that are used by the group of users in at least one database, and running a no match query on the at least one database to identify the at least one new or changed long distance country code.

33. A system according to claim 24 wherein the automatically obtaining comprises automatically obtaining the listing of long distance country codes from a source that directly or indirectly obtained the listing of long distance country codes from the ITU website.

34. A system for updating long distance country codes that are used by a group of users comprising:
means for automatically obtaining a listing of long distance country codes from an International Telecommunication Union (ITU) website;
means for automatically comparing the listing of long distance country codes that is obtained from the ITU website to preexisting long distance country codes that are used by the group of users, to identify at least one new or changed long distance country code; and means for automatically sending an electronic message to the group of users that includes the at least one new or changed long distance country code that was identified.

35. A system according to claim 34 wherein the means for automatically obtaining a listing comprises means for repeatedly obtaining the listing at spaced apart time intervals.

36. A system according to claim 34 wherein the group of users comprises telecommunications technicians who are responsible for provisioning a plurality of telecommunications switches, the system further comprising:
means for provisioning the plurality of telecommunications switches with the at least one new or changed long distance country code.

37. A system according to claim 34 further comprising:
means for obtaining electronic mail addresses of the group of users; and
wherein the means for automatically sending an electronic message comprises means for automatically sending an electronic mail message to the electronic mail addresses of the group of users that includes the at least one new or changed long distance country code that was identified.

38. A system according to claim 34 further comprising:
means for storing the preexisting long distance country codes that are used by the group of users.

39. A system according to claim 34 further comprising means for automatically sending an electronic message to the group of users that indicates that no new or changed long distance country codes were identified in response to failure of the means for automatically comparing to identify at least one new or changed long distance country code.

40. A system according to claim 35 wherein the preexisting long distance country codes that are used by the group of users correspond to the listing of long distance country codes that was automatically obtained from the ITU website by the means for automatically obtaining, in an immediately preceding time interval.

41. A system according to claim 34 wherein the means for automatically comparing comprises:
means for storing the listing of long distance country codes from the ITU website and the preexisting long distance country codes that are used by the group of users in at least one database; and
means for running a no match query on the at least one database to identify the at least one new or changed long distance country code.

42. A system according to claim 34 wherein the means for automatically obtaining is responsive to a trouble report that indicates that at least one of the preexisting country codes is inoperative.

43. A system according to claim 34 wherein the means for automatically obtaining comprises means for automatically obtaining the listing of long distance country codes from a source that directly or indirectly obtained the listing of long distance country codes from the ITU website.

44. A computer program product that is configured to update long distance country codes that are used by a group of users, the computer program product comprising a computer usable storage medium having computer-readable program code embodied in the medium, the computer-readable program code comprising:
computer-readable program code that is configured to automatically obtain a listing of long distance country codes from an International Telecommunication Union (ITU) website;
computer-readable program code that is configured to automatically compare the listing of long distance country codes that is obtained from the ITU website to preexisting long distance country codes that are used by the group of users, to identify at least one new or changed long distance country code; and
computer-readable program code that is configured to automatically send an electronic message to the group of users that includes the at least one new or changed long distance country code that was identified.

45. A computer program product according to claim 44 wherein the computer-readable program code that is configured to automatically obtain a listing comprises computer-readable program code that is configured to repeatedly obtain the listing at spaced apart time intervals.

46. A computer program product according to claim 44 wherein the group of users comprises telecommunications technicians who are responsible for provisioning a plurality of telecommunications switches, the computer program product further comprising:
computer-readable program code that is configured to provision the plurality of telecommunications switches with the at least one new or changed long distance country code.

47. A computer program product according to claim 44 further comprising:
computer-readable program code that is configured to obtain electronic mail addresses of the group of users; and
wherein the computer-readable program code that is configured to automatically send an electronic message comprises computer-readable program code that is configured to automatically send an electronic mail message to the electronic mail addresses of the group of users that includes the at least one new or changed long distance country code that was identified.

48. A computer program product according to claim 44 further comprising:
computer-readable program code that is configured to store the preexisting long distance country codes that are used by the group of users.

49. A computer program product according to claim 44 further comprising computer-readable program code that is configured to automatically send an electronic message to the group of users that indicates that no new or changed long distance country codes were identified in response to failure of the computer-readable program code that is configured to automatically compare to identify at least one new or changed long distance country code.

50. A computer program product according to claim 45 wherein the preexisting long distance country codes that are used by the group of users correspond to the listing of long distance country codes that was automatically obtained by the computer-readable program code that is configured to automatically obtain, from the ITU website in an immediately preceding time interval.

51. A computer program product according to claim 44 wherein the computer-readable program code that is configured to automatically compare comprises:
computer-readable program code that is configured to store the listing of long distance country codes from the ITU website and the preexisting long distance country codes that are used by the group of users in at least one database; and computer-readable program code that is configured to run a no match query on the at least one database to identify the at least one new or changed long distance country code.

52. A computer program product according to claim 44 wherein the computer-readable program code that is configured to automatically obtain is responsive to a trouble report that indicates that at least one of the preexisting country codes is inoperative.

53. A computer program product according to claim 44 wherein the computer-readable program code that is configured to automatically obtain comprises computer-readable program code that is configured to automatically obtain the listing of long distance country codes from a source that directly or indirectly obtained the listing of long distance country codes from the ITU website.

* * * * *